United States Patent [19]

Matsuda et al.

[11] 4,187,282

[45] Feb. 5, 1980

[54] PROCESS FOR TREATING A WASTE GAS CONTAINING SULFUR OXIDES

[75] Inventors: Shimpei Matsuda; Akira Kato; Shigeo Uno; Fumito Nakajima, all of Hitachi, Japan

[73] Assignees: Babcock-Hitachi K.K.; Hitachi, Ltd., both of Japan

[21] Appl. No.: 767,962

[22] Filed: Feb. 11, 1977

[30] Foreign Application Priority Data

Feb. 12, 1976 [JP] Japan ................................ 51-13174
Jun. 16, 1976 [JP] Japan ................................ 51-69760

[51] Int. Cl.$^2$ ......................... C01B 17/00; B01J 8/00; C01B 21/00; C01B 17/02
[52] U.S. Cl. ................................... 423/244; 423/239; 423/570; 423/573 R; 252/190
[58] Field of Search ............... 423/244, 570, 573, 239; 252/190, 191

[56] References Cited

U.S. PATENT DOCUMENTS

| | | | |
|---|---|---|---|
| 1,540,445 | 6/1925 | Wilson | 252/190 |
| 1,900,883 | 3/1933 | Lusby | 423/244 X |
| 3,579,302 | 5/1971 | Sefton | 423/574 |
| 3,725,531 | 4/1973 | Pearson et al. | 423/244 X |
| 3,888,970 | 6/1975 | Haas et al. | 423/244 |
| 4,001,376 | 1/1977 | Cull | 423/244 |

FOREIGN PATENT DOCUMENTS 2439234  2/1975  Fed. Rep. of Germany ........... 423/244

*Primary Examiner*—O. R. Vertiz
*Assistant Examiner*—Gregory A. Heller
*Attorney, Agent, or Firm*—Craig and Antonelli

[57] ABSTRACT

A waste gas containing sulfur oxides is contacted with an adsorbent comprising an intimate mixture of an iron oxide and/or a copper oxide and a titanium oxide at a temperature of 250°–500° C. The sulfur oxides thus adsorbed are desorbed with a reducing gas and recovered as sulfur material.

The efficiency of the adsorbent is not reduced even after many repetitions of the adsorption-desorption cycle. Since the adsorbent exhibits a high resistance to sulfuric acid mist ($SO_3$) contained in the waste gas.

18 Claims, No Drawings

PROCESS FOR TREATING A WASTE GAS CONTAINING SULFUR OXIDES

BACKGROUND OF THE INVENTION

The present invention relates to a process for removing sulfur oxides from gases by adsorption. More particularly, the present invention is characterized in that sulfur oxides contained in various combustion waste gases and waste gases from a Claus plant are removed by adsorption with an adsorbent comprising a titanium oxide and iron oxide and/or copper oxide as principal component(s).

Various sulfur oxides are contained in combustion waste gases from boilers in a power plant, a refining plant, a steel making plant and a chemical plant or in a waste gas from sulfuric acid industry or in a tail gas from Claus furnace wherein sulfur is recovered. Sulfur oxides comprises mainly $SO_2$ and $SO_3$. The sulfur oxides will be referred to as $SO_x$ hereinafter in the specification.

$SO_x$ is a principal cause for air pollution. A legislation restricting the amount of the pollutant released to the atmosphere is expected to be tightened for environmental protection. Several techniques for removing $SO_x$ from a waste gas have been put to practical use. One of the techniques comprises a process wherein $SO_x$ is absorbed with a calcium carbonate slurry and then it is oxidized to form calcium sulfate (gypsum). Another technique comprises a process wherein $SO_x$ is absorbed with an alkaline absorbing liquid, the same is reacted with calcium oxide to form calcium sulfite and calcium sulfite is oxidized to obtain gypsum. According to those processes, gypsum is formed in a large amount. Further, development of a process for treating the absorbing liquid (for example, by-produced Glauber's salt) is required.

As a dry $SO_x$ removal technique, there has been a process wherein $SO_x$ in a waste gas is adsorbed by a solid adsorbent. $SO_x$ thus adsorbed is desorbed from the adsorbent with a reducing gas to obtain a gas containing a relatively high concentration of $SO_x$ and elemental sulfur is recovered from the desorbed gas. This process has merits that sulfur thus obtained is of utility value and that this process is free from a problem of treating waste liquid.

As for a dry process, for removing $SO_x$ from a waste gas there has been known a process wherein $SO_x$ is absorbed or adsorbed by using a solid adsorbing material comprising iron oxide supported on an alumina carrier [David T. Clay and Scott Lynn, Reduction and removal of $SO_2$ and $NO_x$ from Simulated Flue Gas using Iron Oxide as Catalyst Absorbent, AIChE Journal 21 (1975) 466]. There has also been known a process wherein a copper oxide adsorbent supported on an alumina carrier is used (Japanese Patent Publication No. 17951/1974).

However, according to broad supplementary examinations, the inventors have found that adsorbing capacities of the iron oxide and copper oxide adsorbents supported on alumina are reduced gradually while they are used for a long period of time. Particularly, if $SO_3$ (sulfuric acid mist) is contained in a gas to be treated, a part of the alumina carrier is converted to aluminum sulfate, resulting in loss of its function rapidly.

A boiler waste gas contains, in addition to $SO_x$, nitrogen oxides (NO and $NO_2$; hereinafter referred to as $NO_x$) and oxygen gas. It has been found that, when $NO_x$ is reduced to nitrogen with ammonia as the reducing agent and $SO_x$ is adsorbed by the CuO or $Fe_2O_3$ adsorbent-catalyst simultaneous by, the adsorbent supported on alumina carrier is easily deteriorated.

Further, since the CuO or $Fe_2O_3$ adsorbent supported on alumina carrier has not so high adsorption velocity as expected, a large amount of the absorbent is necessitated, and consequently a large amount of energy is wasted for transportation of the gas.

SUMMARY OF THE INVENTION

An object of the invention is to provide a process for removing sulfur oxides from a gas by using an adsorbent of a high efficiency of adsorbing sulfur oxides.

Another object of the invention is to provide a process for removing sulfur oxides from a gas by using a adsorbent with a high resistivity to sulfuric acid and a long life.

Still another object of the invention is to provide a process for treating a gas, wherein $SO_x$ and $No_x$ are removed simultaneously from the gas.

Further object of the invention is to provide a process for collecting sulfur compounds from a waste gas and recovering sulfur from the sulfur compounds.

DESCRIPTION OF DETAILED EMBODIMENTS

The present invention relates to a high temperature, dry process for removing sulfur oxides by using an adsorbent containing an intimate mixture of titanium oxide and iron oxide and/or copper oxide as principal components.

During investigations on the practical use of the conventional iron oxide adsorbent supported on alumina, the inventors fostered an idea that if titanium oxide which is resistant to sulfuric acid is used in place of the alumina carrier, the life of the adsorbent would be prolonged remarkably. However, in case that a sintered, commercial titanium oxide was used in place of alumina, $SO_x$ adsorbing efficiency was not satisfactory. The inventors prepared an adsorbent comprising an intimate mixture of active titanium oxide calcined at a low temperature and iron oxide and/or copper oxide. The adsorbents calcined at a temperature below 600° C. have a high activity as a $SO_x$-adsorbent and also a high activity as a $NO_x$ reducing catalyst. The adsorbent-catalyst of the present invention has a large capacity of $SO_2$ adsorption, a high reactivity of $SO_2$ absorption and a high activity on the reduction of $NO_x$ with $NH_3$. The adsorbent-catalyst maintains those properties for a long period of time because of a high resistivity of $TiO_2$ toward $SO_3$.

It is considered that $SO_x$ in the gas is removed by the adsorbent comprising titanium oxide and iron oxide and/or copper oxide according to the following formula:

$$Fe_2O_3 + 3SO_2 + 3/2O_2 = Fe_2(SO_4)_3 \qquad (1)$$

$$Fe_2O_3 + 3SO_3 = Fe_2(SO_4)_3 \qquad (2)$$

$$CuO + SO_2 + 1/2O_2 = CuSO_4 \qquad (3)$$

$$CuO + SO_3 = CuSO_4 \qquad (4)$$

Prior to the initiation of the adsorption, iron and copper in the adsorbent are present in the form of their oxides which are converted to sulfates as the $SO_x$-adsorption proceeds. If the adsorbent supported on alumina carrier is used, iron and copper are converted to their sulfates and simultaneously, the alumina carrier is converted partially into aluminum sulfate by SO₃ contained in a small amount in the waste gas. The conversion of the carrier component into its sulfate is considered to be a main cause for the deterioration of the alumina-supported adsorbent. On the other hand, if $TiO_2$—$Fe_2O_3$ or $TiO_2$—$CuO$ adsorbent according to the present invention is used, the principal component, i.e. titanium oxide, is not converted to its sulfate substantially, though $Fe_2O_3$ is converted to $Fe_2(SO_4)_3$ and $CuO$ is converted to $CuSO_4$. $TiO_2$—$Fe_2O_3$ and/or $CuO$ adsorbent according to the present invention maintains its $SO_x$-adsorbing efficiency for a long period of time even if it is used for the treatment of a gas containing several tens ppm of $SO_3$.

Thus, the fact that the $SO_x$-adsorbent of the present invention is not deactivated by $SO_3$ contained in a waste gas is due to titanium oxide contained as principal component in the adsorbent. Therefore, titanium oxide content of TiO—$Fe_2O_3$ and/or $CuO$ adsorbent according to the invention should be more than 50% (percentage on atomic basis; the same shall apply hereinafter). If titanium oxide content is less than 50%, durability of the adsorbent in the presence of $SO_3$ is poor unfavourably. Iron oxide and/or copper oxide content is 2–50%, preferably 4–50%. If iron oxide and/or copper oxide content is less than 2%, the $SO_x$-adsorbing capacity of the catalyst is insufficient.

As titanium raw materials for the preparation of titanium oxide-iron oxide and/or copper oxide adsorbent according to the present invention, there may be used titanium oxide (not-treated at a temperature above 600° C.), titanic acids, titanyl sulfate, titanium sulfates and titanium tetrachloride. As iron raw materials, there may be used iron oxides, iron hydroxides, iron carbonates, iron sulfates, iron nitrates and iron halides. As copper raw materials, there may be used copper oxides, copper hydroxides, copper carbonates, copper sulfates, copper nitrates and copper halides. The catalyst can be prepared by any of a coprecipitation process wherein an alkaline solution is added to a mixture solution containing titanium and iron and/or copper to precipitate titanium, iron and/or copper hydroxides, a blending process wherein both oxides are blended together and an impregnation process wherein titanium oxide is shaped and it is then impregnated with an iron and/or copper salt. However, in any case a high absorption velocity, conversion or adsorption capacity cannot be obtained unless titanium, iron and/or copper are in the form of an intimate mixture of them. With the adsorbent of the present invention about two times as high $SO_x$-absorbing velocity as that of an absorbent comprising iron or copper supported on alumina catalyst can be obtained. The reaction temperature is lowered by about 50° C. with the present adsorbent compared with the conventional alumina-supported adsorbent. The adsorbent can be shaped by any of conventional tablet-shaping method, extrusion method and rotary granulation method. After calcination, the components of the adsorbent according to the present invention are in the form of oxides (if iron sulfate or copper sulfate is used, the sulfate is also present). Calcination temperature should be less than 600° C. If the calcination is effected at a temperature above 600° C., specific surface area is usually less than 30 m²/g to lower efficiency of the adsorbent. The preferable calcination temperature of the present adsorbents is 350°~550° C., which usually gives surface area of above 50 m²/g.

The adsorbent according to the invention comprising titanium oxide and iron oxide and/or copper oxide may contain further small amounts (less than 10 atom %) of oxides of molybdenum, tungsten, vanadium, cobalt and nickel. These additives are useful mainly for improving the $NO_x$ reducing activity and the mechanical strength of the adsorbent.

In the removal of $SO_x$ according to the present invention, temperature in the adsorption step is 250°–500° C., preferably 300°–500° C. At a temperature below 250° C., the $SO_x$-adsorption velocity is low, thereby requiring a large amount of adsorbent economically disadvantageously. At a temperature above 500° C., sintering of $TiO_2$-$Fe_2O_3$ and/or $CuO$ adsorbent takes place to lower the adsorbing efficiency. Space velocity of the waste gas is 200–20,000, preferably 300–10,000 hr.⁻¹. The space velocity is determined depending on desired degree of desulfurization. An adsorption column of fixed bed system, moving bed system or fluidized bed system can be used.

In case $NO_x$ is present, in addition to $SO_x$, in waste gas, ammonia is added to the waste gas in order to reduce $NO_x$ to nitrogen. The simultaneous treatment of $SO_x$ and $NO_x$ is possible by provision of a step of adding ammonia to the waste gas, since adsorption of $SO_x$ on the adsorbent and reduction of $NO_x$ into nitrogen can be effected under the same conditions. Of course, the efficiency of adsorption of $SO_x$ is not reduced at all by the addition of ammonia to the waste gas.

For the simultaneous removal of $SO_x$ and $NO_x$ in an embodiment of the invention, 0.7–3.0 moles, preferably 0.7–2.0 moles, of ammonia are added per mole of $NO_x$ in the waste gas. According to the investigations of the inventors, it is considered that the reaction of $NO_x$ and ammonia proceeds in the presence of the adsorbent of the invention as catalyst as follows:

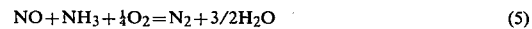

$$NO + NH_3 + \tfrac{1}{4}O_2 = N_2 + 3/2H_2O \tag{5}$$

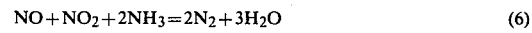

$$NO + NO_2 + 2NH_3 = 2N_2 + 3H_2O \tag{6}$$

The waste gas is contacted with the titanium oxide and iron oxide and/or copper oxide catalyst at a temperature of 250°–500° C., preferably 300°–450° C. At a temperature below 250° C., sufficient catalytic activity cannot be obtained and, accordingly, space velocity of the gas must be reduced uneconomically. At a temperature above 500° C., on the other hand, ammonia is oxidized to $NO_x$ to reduce $NO_x$-reduction rate unfavorably. The $NO_x$-reduction conditions such as temperature and space velocity coincide with the $SO_x$-adsorption conditions.

As the adsorbent of the invention absorbs $SO_x$, iron oxide and copper oxide are converted to iron sulfate and copper sulfate, respectively. However, after the conversion of the oxides into the corresponding sulfates, $NO_x$-reducing efficiency is substantially unchanged and denitration efficiency is stable during the operation.

The adsorbent should be regenerated after a certain period of time, since the adsorbent becomes saturated not to adsorb $SO_x$. For the regeneration, a process is preferred which comprises reducing the sulfates with a reducing gas such as hydrogen, carbon monoxide, methane or LPG (liquefied petroleum gas) to form the metals and sulfur dioxide (and hydrogen sulfide).

The adsorbent after the desorption is in the reduced form, which may be oxidized with air or oxygen or which may be returned to the adsorption step via passing through the waste gas to oxidize the adsorbent with oxygen in the waste gas.

Thus, in the present invention, adsorption-desorption cycle or adsorption-desorption-oxidation cycle is repeated by using $TiO_2$-$Fe_2O_3$ and/or CuO adsorbent. Therefore, in the continuous treatment of a waste gas, it is desirable to use at least two columns filled with the adsorbent so that they can serve in adsorption-desorption-(oxidation) steps in turn.

Sulfur dioxide (and hydrogen sulfide) contained in the desorption gas in a high concentration can be treated by known Claus method or the known desulfurization methods by means of absorption. They can also be used as a raw material for sulfuric acid production.

In the conversion of sulfur dioxide contained in a relatively high concentration in the desorption gas into elemental sulfur by Clause method, sulfur dioxide is first converted to hydrogen sulfide as follows:

$$SO_2 + 3H_2 = H_2S + 2H_2O \quad (7)$$

Reaction (7) can be carried out generally in the presence of Co-Mo or Ni-Mo catalyst. Tempeature of reaction (7) is 250°–400° C., which can be attained by direct introduction of the gas formed in the regeneration step. Claus reaction is represented by following formula (8):

$$SO_2 + 2H_2S = 3/X S_x + 2H_2O \quad (8)$$

wherein X represents a number of 8, 4, 2. Thus, ⅔ amount of sulfur dioxide contained in the desorption gas is converted to hydrogen sulfide. Hydrogen required for carrying out reaction (7) may be incorporated therein prior to reaction (7) but it is preferred to incorporate excess hydrogen in the system during the adsorbent-catalyst regeneration step. In case a desorption gas containing sulfur dioxide in a relatively high concentration is to be treated in Claus furnace, ⅔ of sulfur dioxide is reduced as described above. However, in case hydrogen sulfide is to be converted directly to elemental sulfur according to, for example, Takahax method or Stretford method, it is necessary of course to convert the whole sulfur dioxide in the desorption gas into hydrogen sulfide. It will be understood, therefore, that it is most advantageous from a viewpoint of comsumption of heat and reactants to employ the Claus reaction for the sulfur recovery.

The following examples further illustrate the present invention.

EXAMPLE 1

500 Grams of a metatitanic acid slurry containing 35 wt. % of titanium oxide were kneaded together with 100 g of ferric nitrate [$Fe(NO_3)_3 \cdot 9H_2O$] in a kneader for two hours. Thereafter, the blend was dried at 150° C. for 5 hours, added with 6 g of graphite and molded into a tablet of a diameter of 3 mm and a height of 3 mm with a tabletting machine. The moldings were calcined at 450° C. for 2 hours. The adsorbent thus obtained consisted of titanium oxide and iron oxide in an Ti:Fe atomic ratio of 9:1. The adsorbent had a specific surface area determined by BET method of 150 $m^2$/g.

$SO_x$-removing efficiency of the adsorbent was determined as follows: A quartz reaction tube of an inside diameter of 30 mm was heated externally in an electric furnace. 20 milliliters of the adsorbent were charged in the central part of the reaction tube through which 100 Nl./hr. (space velocity: 500 $hr.^{-1}$) of a composition shown below was passed and $SO_2$ concentration was measured at an outlet of the reaction tube. For the measurement of $SO_2$ concentration, an infrared analyzer of non-dispersive type was used. Results of the experiment wherein reaction temperature was 390° C. are shown in Table 1.

Gas composition: 0.2% $SO_2$, 5% $O_2$, 12% $CO_2$, 12% $H_2O$, and the remainder of $N_2$.

Table 1

| Reaction time (min.) | Example 1 | Comp. Ex. 1 | Example 2 | Example 3 |
|---|---|---|---|---|
| | Outlet $SO_2$ Conc. (%) | | | |
| 15 | 0.015 | 0.029 | 0.009 | 0.020 |
| 30 | 0.018 | 0.043 | 0.015 | 0.022 |
| 45 | 0.029 | 0.063 | 0.019 | 0.039 |
| 60 | 0.032 | 0.150 | 0.028 | 0.035 |

Comparative Example 1

A commercial granular activated alumina ($\gamma$—$Al_2O_3$) was pulverized into fine particles to which was then added an aqueous solution of iron nitrate to obtain iron oxide adsorbent supported on alumina carrier in the same manner as in Example 1. The resulting adsorbent had an iron oxide content of 10 wt. % and a specific surface area of 190 $m^2$/g. An experiment was carried out by using 20 milliliters of the adsorbent under the same reaction conditions as in Example 1 to obtain the results shown in Table 1.

EXAMPLE 2

2.5 kilograms of titanium tetrachloride ($TiCl_4$) were dissolved slowly in 5 liters of water, to which were then added 3.2 kg. of ferric sulfate. An aqueous sodium carbonate solution was added dropwise to the mixture solution to form a coprecipitate of titanium and iron. The precipitate was washed thoroughly and dried at 150° C. for 5 hours. In the same manner as in Example 1, adsorbent was obtained which was in the form of 3 mm$\phi \times$ 3 mm h. tablet. The resulting adsorbent consisted of titanium oxide and iron oxide in an Ti:Fe atomic ratio of 7:3 and had a specific surface area of 170 $m^2$/g.

An experiment was carried out by using 20 milliliters of the adsorbent under the same reaction conditions as in Example 1 except that reaction temperature was 420° C. to obtain the results shown in Table 1.

EXAMPLE 3

200 grams of commercial anatase titanium oxide were mixed with 200 ml. of concentrated (30 N) sulfuric acid and the mixture was heated to 200°–250° C. for 2 hours to convert a part of titanium oxide into titanium sulfate. The mixture of titanium oxide and titanium sulfate thus obtained was cooled and then added with 250 g of iron sulfate to obtain a solution. To the mixture in the form of a slurry of titanium oxide, titanium sulfate and iron sulfate was added an aqueous sodium hydroxide solution dropwise under vigorous stirring to adjust pH to about 8. The resulting precipitate was washed thoroughly. In the same manner as in Example 1, an adsorbent was obtained. The resulting adsorbent consisted of titanium oxide and iron oxide in an Ti:Fe atomic ratio of 8:2 and has a specific surface area of 130 $m^2$/g.

An experiment was carried out by using the adsorbent thus obtained under the same conditions as in Example 1 except that the reaction temperature was 450° C. to obtain the results shown in Table 1.

EXAMPLE 4

In this example, the adsorption-regeneration cycle was repeated many times. Gas to be treated was a waste gas from a oil-fired high pressure boiler having a composition approximately 200 ppm. $NO_x$, 1200 ppm. $SO_2$, 50 ppm. $SO_3$, 5% $O_2$, 12% $CO_2$, 10% $H_2O$ and the remainder of $N_2$. A stainless steel reaction tube of an inside diameter of 50 mm was used, in which 500 ml. of an adsorbent prepared in the same manner as in Example 3 were charged. Hydrogen gas charged in a bomb was used for the reduction step.

Reaction-regeneration cycle was as follows:
(1) Reaction step:
   The gas of the above composition was passed at a space velocity of 5,000 hr.$^{-1}$ for 60 minutes. Reaction temperature was 400° C.
(2) Reduction step:
   Hydrogen was passed at a space velocity of 200 hr.$^{-1}$ for 25 minutes. Reaction temperature was 400° C.
(3) Purge step:
   Nitrogen gas was passed at a space velocity of 100 hr.$^{-1}$ for 5 minutes.

Above steps (1), (2) and (3) were repeated 200 times. $SO_2$ concentrations at the outlet in the 3rd, 100th and 200th cycles of the reaction are shown in Table 2.

Table 2

| Cycle | Time (min.) | Outlet $SO_2$ Conc. (ppm) |
|---|---|---|
| 3 | 15 | 50 |
|   | 30 | 80 |
|   | 60 | 160 |
| 100 | 15 | 30 |
|   | 30 | 70 |
|   | 60 | 140 |
| 200 | 15 | 50 |
|   | 30 | 70 |
|   | 60 | 130 |

Comparative Example 2

The same test as in Example 4 was carried out by using the adsorbent of Comparative Example 1. $SO_2$ concentration at the outlet 30 minutes after initiation of the reaction in the 70the cycle was more than 700 ppm., which indicated that adsorbing efficiency of the adsorbent was reduced remarkably. After carrying out the reaction in the 70th cycle for 60 minutes, the test was discontinued. The adsorbent was taken out and analyzed by X-ray diffraction to reveal a clear diffraction pattern of aluminum sulfate.

EXAMPLE 5

Metatitanic acid [$TiO(OH)_2$] was dried at 120° C., calcined at 500° C. for 2 hours and then pulverized into fine powders smaller than 100 mesh. The powder was molded into spheres of a diameter of 3-5 mm with a rotary granulating machine. The moldings were calcined at 550° C. for two hours. The spherical moldings of titanium oxide were impregnated with a solution of iron nitrate, dried and then baked again at 550° C. for 2 hours. The resulting adsorbent contained 15 wt. % of iron oxide. 50 cycles of the reaction were carried out by using the adsorbent in the same manner as in Example 4. In the 50th cycles, $SO_2$ concentrations at outlet were 40 ppm, 100 ppm, and 170 ppm, after 15 minutes, 30 minutes and 60 minutes, respectively.

The adsorbent prepared in this example by impregnation of titanium oxide moldings with the iron solution exhibits a far higher adsorbing efficiency than that of the adsorbent of Comparative Example 2. However, as compared with the adsorbent of Example 3, the adsorption velocity is a little lower probably due to the fact that the central part of granule does not sufficiently participate in the reaction, since the adsorbent comprises titanium oxide granules merely impregnated with the iron solution.

EXAMPLE 6

500 grams of metatitanic acid slurry containing 35 wt. % of titanium oxide were kneaded together with 72 g of cupric nitrate [$Cu(NO_3)_2.6H_2O$] in a kneader for 2 hours. Thereafter, the blend was dried at 150° C. for 5 hours, added with 6 g of graphite and molded into 3 mm$\phi \times$ 3 mm h. Tablet with a tabletting machine. The moldings were calcined at 450° C. for 2 hours. The catalyst thus obtained consisted of titanium oxide and copper oxide in an Ti:Cu atomic ratio of 9:1. The adsorbent had a specific surface area determined by BET method of 93 m$^2$/g.

Adsorbing efficiency of the adsorbent for a gas of 0.2% $SO_2$ content was determined in the same manner as in Example 1 at the reaction temperature of 350° C. The result is shown in Table 3. Amount of $SO_2$ adsorbed during the reaction was about 0.008 mole. Copper oxide content of the adsorbent used was about 0.03 mole.

EXAMPLE 7

2.7 kg of titanium tetrachloride ($TiCl_4$) was slowly dissolved into 5 liters of water, to which was added 1.7 kg of cupric sulfate. The coprecipitate of Ti and Cu was obtained by adding sodium carbonate solution to the mixture solution. The coprecipitate was washed throughly, dried at 150° C. for 5 hours, and molded into 3 mm$\phi \times$ 3 mm h tablet. Using the same method described in Example 1, the adsorbent consisting of $TiO_2$ and CuO in an Ti:Cu atomic ratio 7:3 was obtained. The surface are was 146 m$^2$/g.

Using 20 ml of the adsorbent thus obtained, an experiment was carried out under the same conditions as Example 1 except the reaction temperature was 400° C. The result is shown in Table 3.

Comparative Example 3

A solution of cupric nitrate was added to a commercial powdered alumina ($\gamma$—$Al_2O_3$) and an adsorbent consisting cupper oxide carried on $\gamma$—$Al_2O_3$ was prepared according to the method described in Example 6. The adsorbent thus obtained contained 10% (weight) cupper oxide and the surface area was 180 m$^2$/g. Using 20 ml of the adsorbent, an experiment was carried out under the same conditions as in Example 6. The result is shown in Table 3.

Table 3

| Reaction time (min.) | Example 6 | Example 7 | Comp. Ex. 3 |
|---|---|---|---|
| | Outlet $SO_2$ Conc. (%) | | |
| 15 | 0.009 | 0.006 | 0.012 |
| 30 | 0.013 | 0.011 | 0.026 |
| 45 | 0.016 | 0.012 | 0.052 |

Table 3-continued

| Reaction time (min.) | Example 6 | Example 7 | Comp. Ex. 3 |
|---|---|---|---|
| | Outlet SO$_2$ Conc. (%) | | |
| 60 | 0.024 | 0.016 | 0.103 |

EXAMPLE 8

In this example, reaction-regeneration cycle was repeated many times. A gas containing both NO$_x$ and SO$_x$ was treated.

2.5 kilograms of titanium tetrachloride (TiCl$_4$) were dissolved in 5 liters of water. The solution was then added with 4.3 Kg of ferric sulfate. A solution of sodium carbonate was added dropwise to the solution to form coprecipitate of titanium and iron. The precipitate was washed thoroughly and dried at 150° C. for 5 hours. 6 grams of graphite were added thereto and the same was molded into tablets of a diameter of 3 mm and a height of 3 mm, which were then calcined at 450° C. for 2 hours to obtain adsorbent. The adsorbent consisted of titanium oxide and iron oxide in a Ti:Fe atomic ratio of 6:4 and had a specific surface area of 170 m$^2$/g.

An experiment of removing NO$_x$ and SO$_x$ with the adsorbent was carried out as follows:

A quartz reaction tube of an inside diameter of 30 mm was heated externally in an electric furnace. 20 milliliters of the adsorbent were charged in the central part of the reaction tube, through which 100 Nl/hr. of a gas of a composition shown below was passed at a space velocity of 5,000 hr.$^{-1}$ and SO$_2$ concentration and NO concentration were measured at inlet and outlet of the catalyst bed. For the measurement of SO$_2$, an infrared analyzer of non-dispersive type was used. For the measurement of NO, an NO-NO$_2$ analyzer of chemiluminescent type was used.

| Gas composition: | 300 ppm | NO |
|---|---|---|
| | 360 ppm | NH$_3$ |
| | 2000 ppm | SO$_2$ |
| | 100 ppm | SO$_3$ |
| | 5% | O$_2$ |
| | 12% | CO$_2$ |
| | 12% | H$_2$O |
| | the remainder | N$_2$ |

Reaction-regeneration cycle was as follows:
(1) Reaction:
   The gas of the above composition was passed at a space velocity of 5,000 hr.$^{-1}$ at a reaction temperature of 400° C. for 60 minutes.
(2) Regeneration:
   A gaseous mixture comprising 50% of hydrogen and 50% of nitrogen was passed at a space velocity of 200 hr.$^{-1}$ for 25 minutes. Reaction temperature was 400° C.
(3) Purge:
   Nitrogen gas was passed at a space velocity of 100 hr.$^{-1}$ for 5 minutes to effect the purge in the reaction tube.

Above steps (1), (2) and (3) were repeated 100 times. Results of the reaction in the 10th, 50th and 100th cycles are shown in Table 4.

Table 4

| Cycle | Time (min.) | Outlet NO$_x$ Conc. (ppm) | Outlet SO$_2$ Conc. (ppm) |
|---|---|---|---|
| 10 | 15 | <1 | 120 |
| | 30 | <1 | 130 |
| | 60 | <1 | 190 |
| 50 | 15 | <1 | 100 |
| | 30 | <1 | 120 |
| | 60 | <1 | 230 |
| 100 | 15 | <1 | 90* |
| | 30 | <1 | 140 |
| | 60 | <1 | 250 |

*SO$_3$ Concentration at the outlet was less than 5 ppm.

EXAMPLE 9

Using the adsorbent described in Example 6, an experiment was carried out under the same conditions as in Example 8 except that the temperature of the reaction and regeneration was 380° C. The results are shown in Table 5.

Table 5

| Cycle | Time (min.) | Outlet NO$_x$ Conc. (ppm) | Outlet SO$_2$ Conc. (ppm) |
|---|---|---|---|
| 10 | 15 | <1 | 50 |
| | 30 | <1 | 80 |
| | 60 | <1 | 120 |
| 50 | 15 | <1 | 60 |
| | 30 | <1 | 80 |
| | 60 | <1 | 170 |
| 100 | 15 | <1 | 60* |
| | 30 | <1 | 100 |
| | 60 | <1 | 150 |

*Outlet SO$_3$ concentration was less than 5 ppm.

Comparative Example 4

The same experiment as in Example 8 was carried out by using the adsorbent of Comparative Example 1. 15 Minutes after initiation of the reaction in the 7th cycle, outlet NO$_x$ concentration was 180 ppm and outlet SO$_2$ concentration was above 1000 ppm., which indicated that the catalyst of Comparative Example 1 was deteriorated seriously. Causes of the deterioration are that the alumina was converted to sulfate and aluminum sulfate cannot be regenerated into the oxide.

The process of the present invention for removing sulfur has advantages that NO$_x$ in the gas can also be converted to harmless compounds under the same conditions. Further, the treatment system including sulfur recovery step is simple and thermally economical. The process is thus industrially advantageous.

We claim:
1. A process for treating a gas containing sulfur oxides comprising the steps of contacting the gas with an adsorbent catalyst to remove the sulfur oxides by adsorbing the sulfur oxides on the adsorbent catalyst and then desorbing the sulfur oxides from the adsorbent catalyst, wherein the adsorbent catalyst consists essentially of at least 50 atomic percent of titanium oxide, from 2 to 50 atomic percent of at least one of iron oxide and copper oxide and up to 10 atomic percent of oxides of molybdenum, tungsten, vanadium, cobalt and nickel, said adsorbent catalyst being free of aluminum oxide, said adsorbent catalyst being prepared by molding a coprecipitate of titanium hydroxide and at least one of iron hydroxide and copper hydroxide and calcining the moldings at a temperature below 600° C. under an oxidizing atmosphere.

2. A process for treating a gas containing sulfur oxides according to claim 1, wherein the adsorbent catalyst has a specific surface area of at least 30 m²/g.

3. A process for treating a gas containing sulfur oxides which comprises contacting a gas containing sulfur oxides and oxygen with an adsorbent catalyst of a specific surface area of at least 30 m²/g consisting essentially of at least 50 atomic percent of titanium oxide, from 2 to 50 atomic percent of at least one of iron oxide and copper oxide and up to 10 atomic percent of oxides of molybdenum, tungsten, vanadium, cobalt and nickel, said adsorbent catalyst being free of aluminum oxide, said adsorbent catalyst being prepared by molding a coprecipitate of titanium hydroxide and at least one of iron hydroxide and copper hydroxide and calcining the moldings at a temperature below 600° C. under an oxidizing atmosphere, at a temperature in the range of 250°–500° C. to adsorb sulfur oxides and then contacting the adsorbent catalyst with a reducing gas to desorb the adsorbed sulfur oxides.

4. A process for treating a gas containing sulfur oxides, nitrogen oxides and oxygen, which comprises the steps of adding ammonia to the gas, contacting the gas with an adsorbent catalyst of a specific surface area of at least 30 m²/g consisting essentially of at least 50 atomic percent of titanium oxide, from 2 to 50 atomic percent of at least one of iron oxide and copper oxide and up to 10 atomic percent of oxides of molybdenum, tungsten, vanadium, cobalt and nickel, said adsorbent catalyst being free of aluminum oxide, said adsorbent catalyst being prepared by molding a coprecipitate of titanium hydroxide and at least one of iron hydroxide and copper hydroxide and calcining the moldings at a temperature below 600° C. under an oxidizing atmosphere, at a temperature in the range of 250°–500° C. at a space velocity of 200–20,000 hr$^{-1}$ to adsorb the sulfur oxides in the gas on the adsorbent catalyst and to reduce the nitrogen oxides into nitrogen and water with ammonia, contacting the adsorbent catalyst carrying the sulfur oxides adsorbed thereon with at least one reducing gas selected from the group consisting of hydrogen, carbon monoxide and methane to regenerate the adsorbent catalyst, and recovering sulfur from the sulfur-containing gas from the regeneration step.

5. A process according to claim 4, wherein the adsorbent catalyst is a homogeneous mixture of titanium oxide and iron oxide and/or copper oxide and the adsorbent catalyst contains titanium and iron and/or copper in an atomic ratio of titanium: iron and/or copper of 98:2–50:50.

6. A process for treating a gas containing sulfur oxides, which comprises the steps of contacting a gas containing sulfur oxides and oxygen with an adsorbent catalyst of a specific surface area of at least 30 m²/g that consists essentially of titanium and iron and/or copper in an atomic ratio of titanium:iron and/or copper of 98:2–50:50, said adsorbent catalyst being free of aluminum oxide, which adsorbent catalyst has been prepared by molding a coprecipitate of the titanium and iron and/or copper constituents of said adsorbent catalyst and calcining the moldings at a temperature below 600° C., the contact being effected at a temperature in the range of 250°–500° C.; contacting the adsorbent catalyst carrying the sulfur oxides adsorbed thereon with a reducing gas to desorb the sulfur oxides from the adsorbent catalyst and recovering sulfur from the sulfur-containing desorbed gas from the desorption step.

7. A process according to claim 6, wherein in the sulfur-recovery step, at least a part of sulfur dioxide contained in the desorption gas is reduced into hydrogen sulfide and the hydrogen sulfide thus formed is reacted with sulfur dioxide in the presence of a catalyst to recover elemental sulfur.

8. A process according to claim 1, wherein the adsorbent catalyst has a specific surface area of at least 50 m²/g.

9. A process according to claim 3, wherein the adsorbent catalyst has a specific surface area of at least 50 m²/g.

10. A process according to claim 1, wherein the adsorbent catalyst consists of titanium oxide and at least one of iron oxide and copper oxide.

11. A process according to claim 3, wherein the adsorbent catalyst consists of titanium oxide and at least one of iron oxide and copper oxide.

12. A process according to claim 1, wherein the adsorbent catalyst consists of titanium oxide and iron oxide.

13. A process according to claim 1, wherein the adsorbent catalyst consists of titanium oxide and copper oxide.

14. A process according to claim 1, wherein the adsorbent catalyst is contacted with the gas containing sulfur oxides at a temperature range of from 250°–500° C. and at a space velocity of 200–20,000 hr$^{-1}$.

15. A process according to claim 4, wherein 0.7–3.0 moles of ammonia are added to the gas containing sulfur oxides, nitrogen oxides and oxygen per mole of nitrogen oxides in the gas.

16. A process for treating a gas containing sulfur oxides which comprises contacting a gas containing sulfur oxides and oxygen with an adsorbent catalyst of a specific surface area of at least 30 m²/g consisting essentially of at least 50 atomic percent of titanium oxide, from 2 to 50 atomic percent of at least one of iron oxide and copper oxide and up to 10 atomic percent of oxides of molybdenum, tungsten, vanadium, cobalt and nickel, said adsorbent catalyst being free of aluminum oxide, said adsorbent catalyst being prepared by molding a coprecipitate of titanium hydroxide and iron hydroxide and calcining the moldings at a temperature below 600° C. under an oxidizing atmosphere, said contacting a gas containing sulfur oxides and oxygen occurring at a temperature in the range of 250°–500° C. to adsorb sulfur oxides, and then contacting the adsorbent catalyst with a reducing gas to desorb the adsorbed sulfur oxides.

17. A process for treating a gas containing sulfur oxides which comprises contacting a gas containing sulfur oxides and oxygen with an adsorbent catalyst of a specific surface area of at least 30 m²/g consisting essentially of at least 50 atomic percent of titanium oxide, from 2 to 50 atomic percent of at least one of iron oxide and copper oxide and up to 10 atomic percent of oxides of molybdenum, tungsten, vanadium, cobalt and nickel, said adsorbent catalyst being free of aluminum oxide, said adsorbent catalyst being prepared by molding a coprecipitate of titanium hydroxide and iron hydroxide and calcining the moldings at a temperature below 600° C. under an oxidizing atmosphere, wherein the adsorbent catalyst contains titanium and iron in an atomic ratio of titanium:iron of 98:2–50:50, said contacting gas containing sulfur oxides and oxygen occurring at a temperature in the range of 250°–500° C. to adsorb sulfur oxides, and then contacting the adsorbent catalyst with a reducing gas to desorb the adsorbed sulfur oxides.

18. A process for treating a gas containing sulfur oxides which comprises contacting a gas containing sulfur oxides and oxygen with an adsorbent catalyst of a specific surface area of at least 30 m$^2$/g consisting essentially of at least 50 atomic percent of titanium oxide, from 2 to 50 atomic percent of at least one of iron oxide and copper oxide and up to 10 atomic percent of oxides of molybdenum, tungsten, vanadium, cobalt and nickel, said adsorbent catalyst being free of aluminum oxide, said adsorbent catalyst being prepared by molding a coprecipitate of titanium hydroxide and copper hydroxide and calcining the moldings at a temperature below 600° C. under an oxidizing atmosphere, with the adsorbent catalyst containing titanium and copper in an atomic ratio of titanium:copper of 98:2–50:50, said contacting gas containing sulfur oxides and oxygemn occurring at a temperature in the range of 250°–500° C. to adsorb sulfur oxides, and then contacting the adsorbent catalyst with a reducing gas to desorb the adsorbed sulfur oxides.

* * * * *